US006983387B2

(12) United States Patent
Boerstler et al.

(10) Patent No.: US 6,983,387 B2
(45) Date of Patent: Jan. 3, 2006

(54) MICROPROCESSOR CHIP SIMULTANEOUS SWITCHING CURRENT REDUCTION METHOD AND APPARATUS

(75) Inventors: David William Boerstler, Round Rock, TX (US); Sang Hoo Dhong, Austin, TX (US); Harm Peter Hofstee, Austin, TX (US); Peichun Peter Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 10/273,617

(22) Filed: Oct. 17, 2002

(65) Prior Publication Data

US 2004/0078613 A1 Apr. 22, 2004

(51) Int. Cl.
*H03L 7/06* (2006.01)

(52) U.S. Cl. .................................................... 713/322

(58) Field of Classification Search ................ 713/322
See application file for complete search history.

(56) References Cited

U.S. PATENT DOCUMENTS 6,751,786 B2 * 6/2004 Teng et al. .................... 716/18
2003/0208736 A1 * 11/2003 Teng et al. .................... 716/7
2004/0078766 A1 * 4/2004 Andreev et al. ............... 716/6
2004/0093185 A1 * 5/2004 Huisman et al. ............ 702/185
2004/0193981 A1 * 9/2004 Clark et al. ................. 714/726

* cited by examiner

*Primary Examiner*—John R. Cottingham
(74) *Attorney, Agent, or Firm*—Carr LLP; Diana R. Gerhardt

(57) ABSTRACT

Disclosed is an electronic chip containing a plurality of electronic circuit partitions, distributed over the area of the chip, each including a processor core and a clock phase domain different from cores in other partitions of the chip. A source of same frequency, but different phase clock signals representing different clock domains, provides different phase signals to adjacent partitions for the purpose of reducing instantaneous magnitude switching currents. Intra-chip communication circuitry distributes control and data signals between partitions.

18 Claims, 9 Drawing Sheets

MICROPROCESSOR CHIP SIMULTANEOUS SWITCHING CURRENT REDUCTION METHOD AND APPARATUS

TECHNICAL FIELD

The present invention relates to switching and, in particular, control of switching currents.

BACKGROUND

Traditional microprocessor designs typically utilize synchronous clocking techniques, which use a single clock phase that is globally distributed in an isochronous manner so that clock signal skew throughout the electronic package is minimized. Since all of the loads for this global clock are switched at roughly the same time, the simultaneous switching current demands placed on the package and the power distribution design typically will have a significant impact upon parameters or items such as performance, reliability, technology, wireability, yield and cost. The inductive effects that will occur with large switching currents may produce over and/or under voltage transients that contribute to premature failure of various electronic components. Such switching currents may also generate significant signal radiation requiring emission shielding to be incorporated in the electronic package.

Microprocessor chips incorporating a plurality of microprocessors can have a significantly larger number of simultaneous switch operations at a given time than do chips containing many other types of circuitry. Thus the above-referenced problems are particularly apparent in connection with microprocessor chips.

Additional information as to the operation of this invention in conjunction with a generalized switching current reduction application may be found in a co-pending application entitled "Multiphase Clocking Method and Apparatus" (Docket No. AUS920020470US1) filed concurrently herewith and incorporated herein by reference for all purposes. The referenced application names the same inventors and is assigned to the same assignee.

It would thus be desirable to reduce the switching current magnitude occurring at any given time and accordingly reduce inductive effects (L) and signal radiation generated with rapid current level changes (di/dt).

SUMMARY OF THE INVENTION

One or more of the foregoing switching disadvantages are reduced in a multiprocessor electronic package by dividing the package circuitry into a plurality of partitions each containing circuitry that may be operationally switched at times different from circuitry in other partitions of the given plurality of partitions. A multiphase clock generator is used to provide different phase clock signals to each of the plurality of partitions, whereby switching operationally occurs at different times in each of the partitions of the electronic package. With this approach, simultaneous switching current and power is reduced for I/O operations.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

The present invention uses multiple phase-staggered clocks for different intra-chip or inter-chip I/O functions. With this approach, simultaneous switching current and power is reduced for I/O operations.

Figure 1:
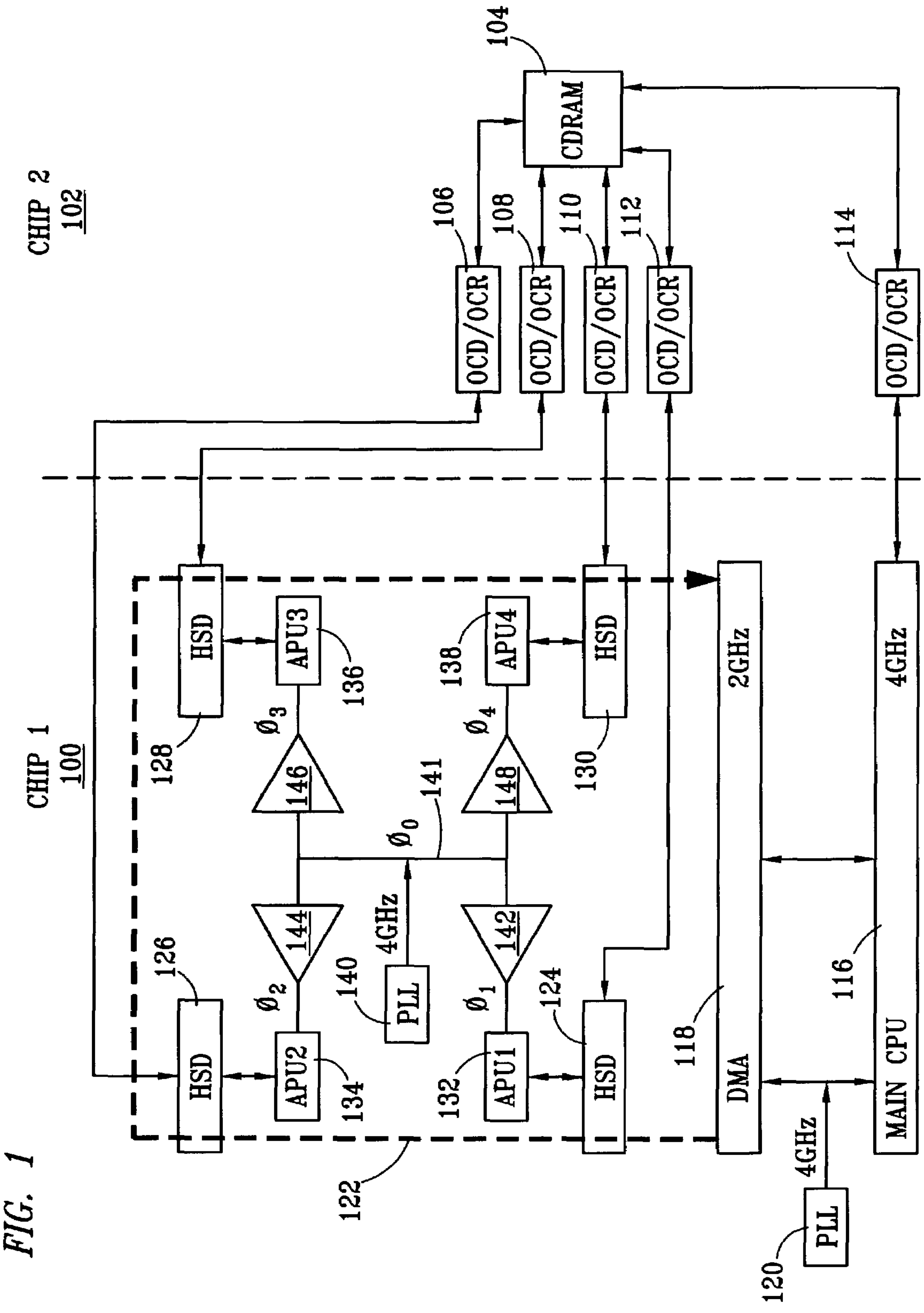
FIG. 1 is a block diagram of a multiprocessor chip and associated wherein the processors are distributed over the area of the chip and each operates in a different clock domain.

In FIG. 1, two separate electronic chips 100 and 102 are shown separated by a dashed line not designated numerically. The chip 100 includes a plurality of processors, while chip 102 comprises associated memory to be used by the processors of chip 100. As part of the chip 102, there is shown a CDRAM (Custom Dynamic Random Access Memory) 104 and a plurality of combination OCD/OCR (Off Chip Drivers/Off Chip Receivers) operationally two way devices 106, 108, 110, 112 and 114 used for interfacing communication and data transfer between the CDRAM 104 and the CPUs (Central Processor Units) of chip 100.

As part of chip 100, there is shown a main CPU 116 communicating with a DMA (Direct Memory Access) block 118. CPU 116 also communicates with CDRAM 104 on chip 102 via the OCD/OCR 114. A PLL (Phase Lock Loop) circuit 120 provides 4 GHz (Giga Hertz) clock signals to both of the blocks 116 and 118. The main CPU communicates with a plurality of APUs (Auxiliary Processor Units) on the chip 100 via a ring type communication network designated as 122 and connected in succession from the DMA 118 to a plurality of HSDs (High Speed Input/Output Latches and Drivers) 124, 126, 128 and 130 before the signals transmitted are returned to the DMA 118. The HSD 124 is additionally able to communicate with the CDRAM 104 via the OCD/OCR 112. An $APU_1$ 132 communicates with either the main CPU 116 or with the CDRAM 104 via the HSD 124. The HSD 126 is additionally able to communicate with the CDRAM 104 via the OCD/OCR 106. An $APU_2$ 134 communicates with either the main CPU 116 or with the CDRAM 104 via the HSD 126. The HSD 128 is additionally able to communicate with the CDRAM 104 via the OCD/OCR 108. An $APU_3$ 136 communicates with either the main CPU 116 or with the CDRAM 104 via the HSD 128. The HSD 130 is additionally able to communicate with the CDRAM 104 via the OCD/OCR 110. An $APU_4$ 138 communicates with either the main CPU 116 or with the CDRAM 104 via the HSD 130.

A PLL 140, which in some circuit packaging instances may be the PLL 120, uses a base 1 GHz reference signal, identical to that used by PLL 120, to create a 4 GHz signal $\varnothing_0$ on a lead 141. This 4 GHz signal is supplied to timing delay circuits 142, 144, 146 and 148. The delay circuit 142 delays the signal $\varnothing_0$ in a manner to apply a signal $\varnothing_1$ to be used by $APU_1$ 132. The delay circuit 144 delays the signal $\varnothing_0$ in a manner to apply a signal $\varnothing_2$ to be used by $APU_2$ 134. The delay circuit 146 delays the signal $\varnothing_0$ in a manner to apply a signal $\varnothing_3$ to be used by $APU_3$ 136. The delay circuit 148 delays the signal $\varnothing_0$ in a manner to apply a signal $\varnothing_4$ to be used by $APU_4$ 138.

Figure 2A:
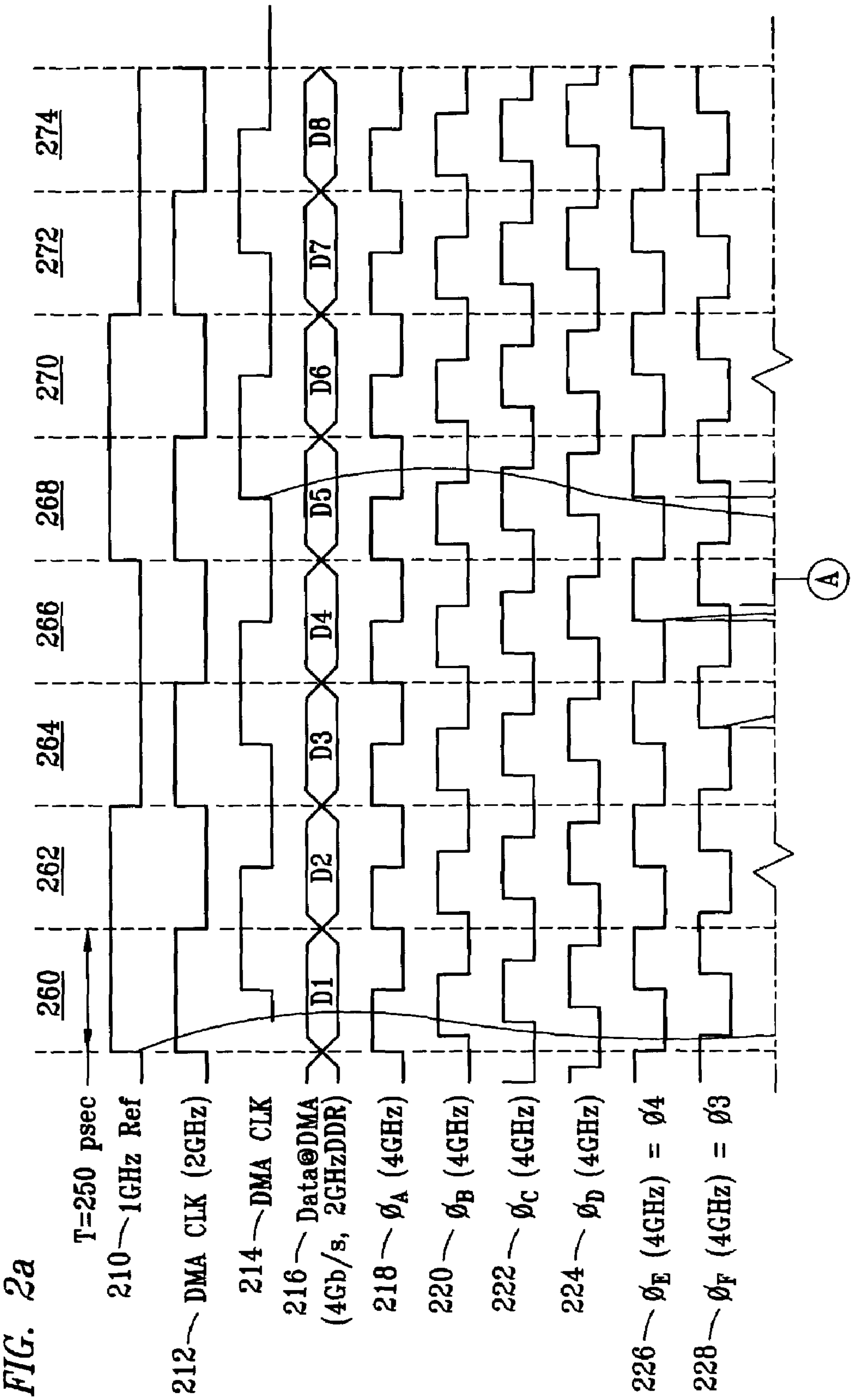
FIGS. 2 through 7 are waveforms used in describing the operation of FIG. 1.
Figure 2B:
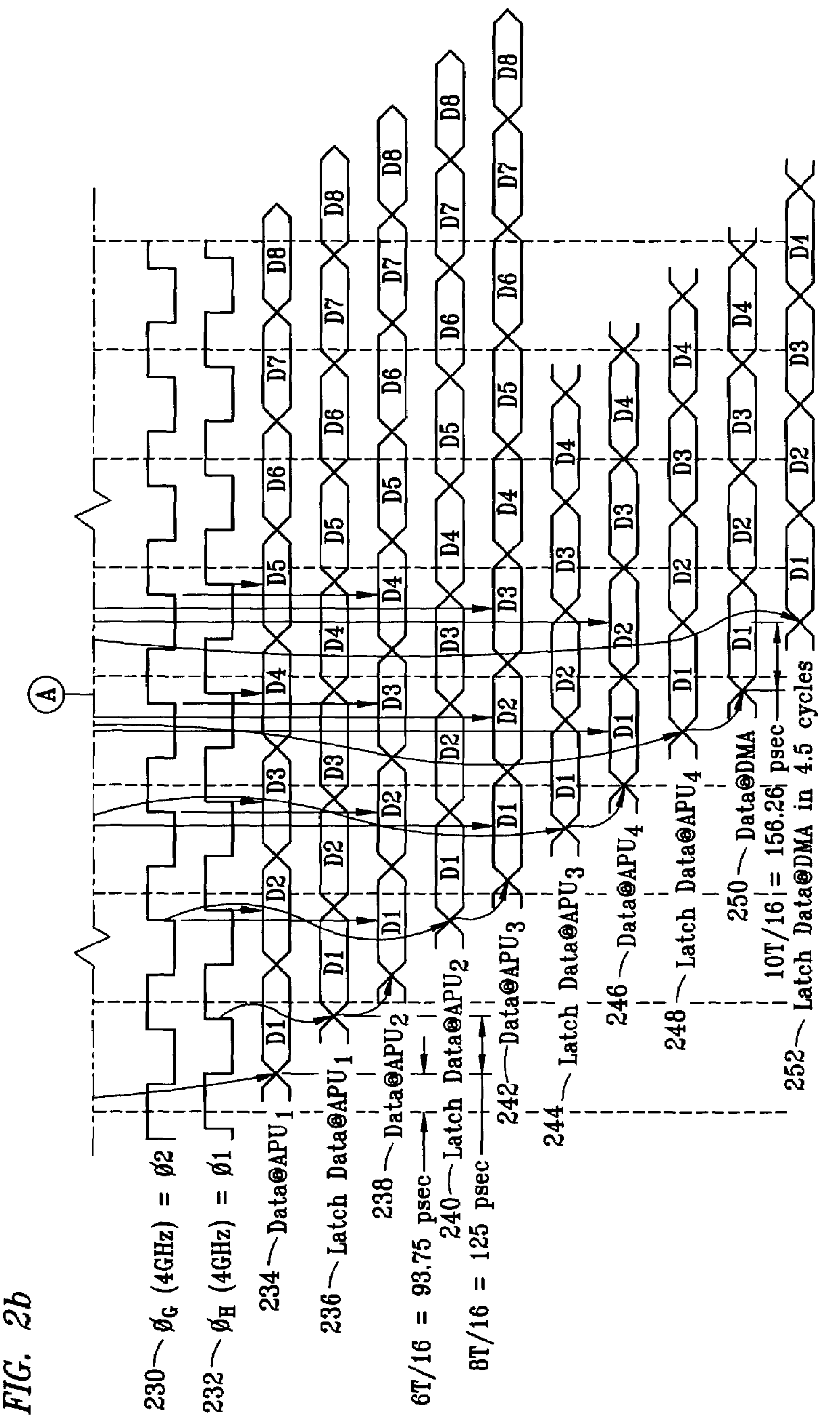

In FIGS. 2*a* and 2*b*, there is a plurality of waveforms designated by even numbers from 210 through 252. For convenience in explaining the operation of FIG. 1, eight 250 picosecond (psec) time periods "T" are designated with even numbers from 260 through 274. This explanation assumes 8 data cycle clocking with 4.5 cycles for the data to cycle from the DMA, through the APUs (auxiliary processor units) and back to the DMA. As shown, there is a 3T/8 delay to the APU, 7T/8 cycle clocking, a T/2 latch setup time, a 5T/8 DMA setup time and a 2 GHz DDR (double data rate) APU ring for distributing the data via ring network 122.

In FIG. 2*a*, waveform 210 shows a 1 GHz reference clock used to generate the various other frequency and phase clock signals used within the chip. Waveform 212 represents a 2 GHZ clock used by the DMA (Direct Memory Access) block while waveform 214 is a similar quadrature phase clock used by the DMA.

Waveform 216 illustrates the timing of 8 different sets of data at the DMA occurring at a 2 GHz DDR. A clock waveform 218 illustrates the timing of a 4 GHZ waveform $\varnothing_A$ starting at a time coincident with the 1 GHZ reference 210. A clock waveform 220 illustrates the timing of a 4 GHZ waveform $\varnothing_B$ starting at a time ⅛ of a cycle later than waveform 218. A clock waveform 222 illustrates the timing of a 4 GHz waveform $\varnothing_C$ starting at a time ⅛ of a cycle later than waveform 220. A clock waveform 224 illustrates the timing of a 4 GHz waveform $\varnothing_D$ starting at a time ⅛ of a cycle later than waveform 222. A clock waveform 226 illustrates the timing of a 4 GHz waveform $\varnothing_E$ starting at a time ⅛ of a cycle later than waveform 220, thus making it 180 degrees out of phase with waveform 218. A clock waveform 228 illustrates the timing of a 4 GHz waveform $\varnothing_F$ starting at a time ⅛ of a cycle later than waveform 226, thus making it 180 degrees out of phase with waveform 220.

Continuing in FIG. 2*b*, clock waveform 230 illustrates the timing of a 4 GHz waveform $\varnothing_G$ starting at a time ⅛ of a cycle later than waveform 228, thus making it 180 degrees out of phase with waveform 222. A clock waveform 232 illustrates the timing of a 4 GHZ waveform $\varnothing_H$ starting at a time ⅛ of a cycle later than waveform 230, thus making it 180 degrees out of phase with waveform 224. Waveform 232 is representative of the $\varnothing_1$ signal applied to $APU_1$ in FIG. 1. Similarly, waveforms 230, 228 and 226 are representative, respectively, of the waveforms $\varnothing_2$, $\varnothing_3$ and $\varnothing_4$ applied to APUs 2, 3 and 4 of FIG. 1.

A waveform 234 illustrates the timing of the data stream, originating from the DMA as shown in waveform 216, during the time it is applied to $APU_1$. This data stream is delayed by 3T/8 or 93.75 psec from waveform 216. A waveform 236 illustrates the timing of the data stream, originating from the DMA as shown in waveform 216, during the time it is available to the output latch of $APU_1$. This data stream is delayed by T/2 or 125 psec from waveform 234. A waveform 238 illustrates the timing of the data stream, originating from the DMA as shown in waveform 216, during the time it is available to the input of $APU_2$. This data stream is delayed by 3T/8 or 93.75 psec from waveform 236. A waveform 240 illustrates the timing of the data stream, originating from the DMA as shown in waveform 216, during the time it is available to the output latch of $APU_2$. The data stream of waveform 240 is delayed by T/2 or 125 psec from waveform 238. A Waveform 242 illustrates the timing of the data stream, originating from the DMA as shown in waveform 216, during the time it is available to $APU_3$. The data stream of waveform 242 is delayed by 3T/8 or 93.75 psec from waveform 240. A waveform 244 illustrates the timing of the data stream, originating from the DMA as shown in waveform 216, during the time it is available to the output latch of $APU_3$. The data stream of waveform 240 is delayed by T/2 or 125 psec from waveform 238. A waveform 246 illustrates the timing of the data stream, originating from the DMA as shown in waveform 216, during the time it is available to $APU_4$. The data stream of waveform 246 is delayed by 3T/8 or 93.75 psec from waveform 244. A waveform 248 illustrates the timing of the data stream, originating from the DMA as shown in waveform 216, during the time it is available to the output latch of $APU_4$. The data stream of waveform 248 is delayed by T/2 or 125 psec from waveform 246. A waveform 250 illustrates the timing of the data stream, originating from the DMA as shown in waveform 216, during the time it is available to be returned to the DMA via ring network. The data stream of waveform 250 is delayed by 3T/8 or 93.75 psec from waveform 248. A waveform 252 illustrates the timing of the data stream, originating from the DMA as shown in waveform 216, during the time it is available to the output latch of the DMA. The data stream of waveform 252 is delayed by T/2 or 125 psec from waveform 248.

Figure 3A:
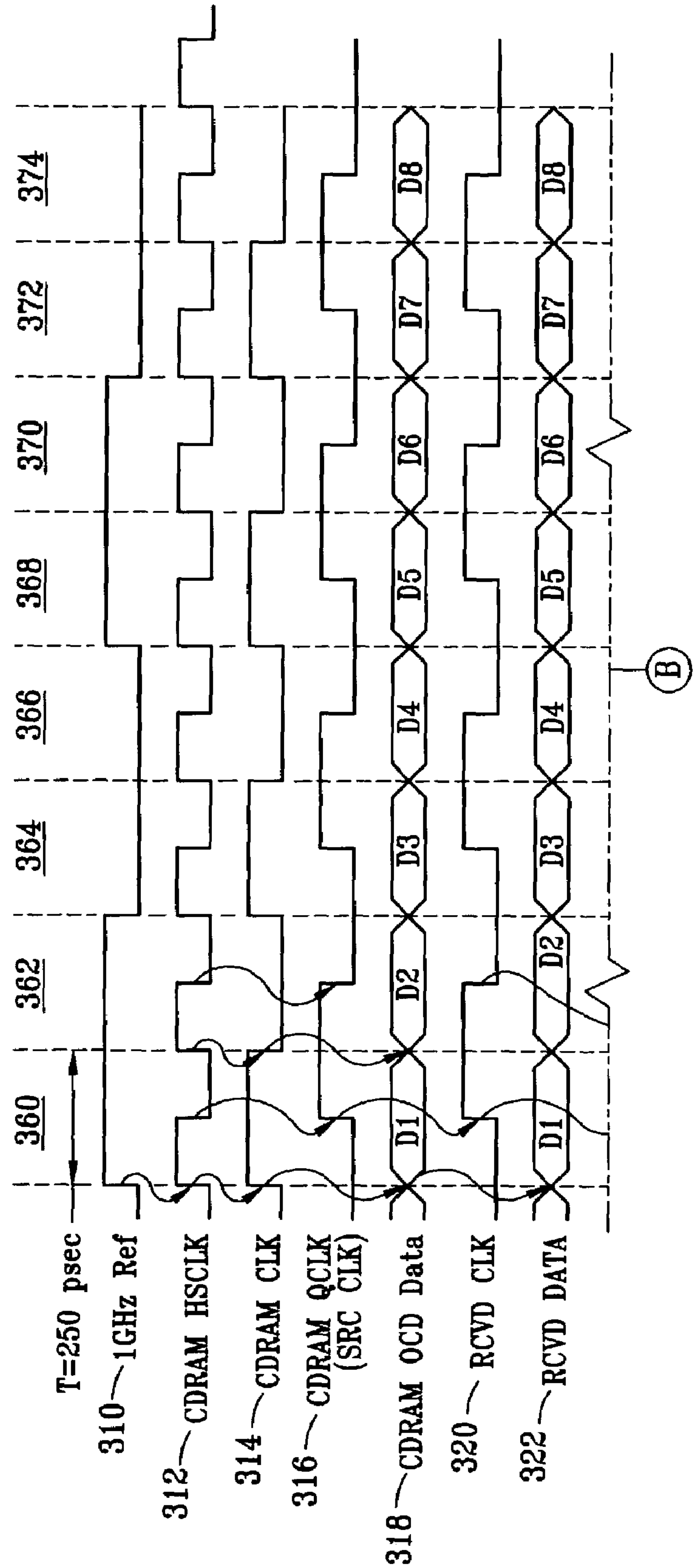
Figure 3B:
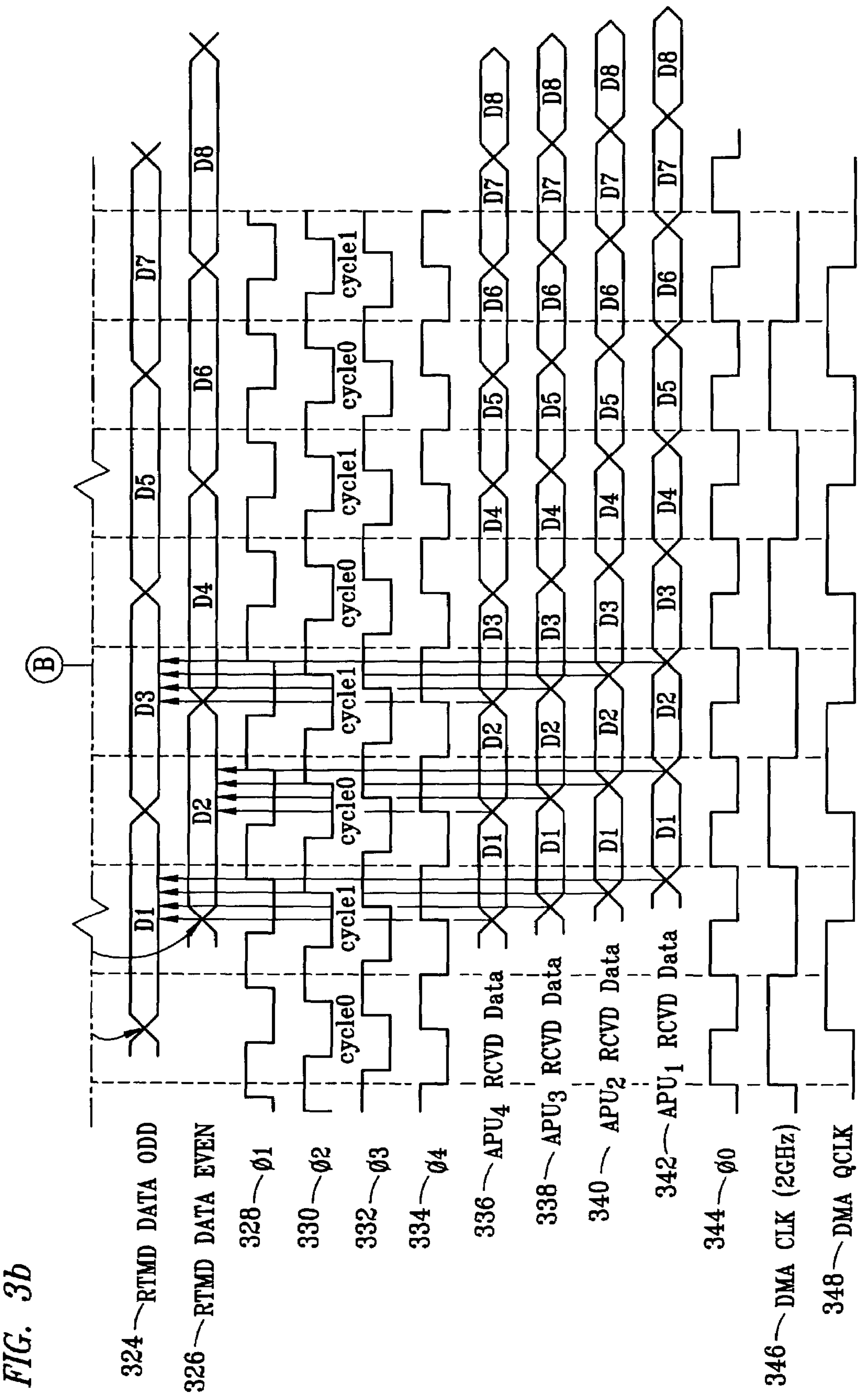

In FIGS. 3*a* and 3*b*, there is a plurality of waveforms designated by even numbers from 310 through 348. For convenience in explaining the operation of FIG. 1, eight 250 picosecond (psec) time periods "T" are designated with even numbers from 360 through 374. These waveforms are used in conjunction with the transfer of data from the CDRAM to the APUs. The waveforms as drawn are idealized, as no actual transmission delay is shown.

In FIG. 3*a*, a waveform 310 shows a 1 GHz reference clock used to generate the various other frequency and phase clock signals used within the chip. Waveform 312 represents a high speed 4 GHz clock within the CDRAM. A waveform 314 is indicative of a 2 GHz clock used by the CDRAM, while waveform 316 is a quadrature phase equivalent of waveform 314. A waveform 318 represents times when eight different sets of data are available to be delivered from the CDRAM OCD/OCR to retiming circuitry in the CDRAM. Waveforms 320 and 322 are signals received from the CDRAM 104 as part of a "source synchronous" data transfer.

Continuing in FIG. 3*b*, a waveform 324 illustrates retimed data for ODD numbered times, while waveform 326 illustrates retimed data for EVEN numbered times. A waveform 328 corresponds to previously mentioned waveform 232 in FIG. 2*b*. Likewise, waveforms 330, 332 and 334 correspond, respectively, to waveforms 230, 228 and 226. The waveform 336 represents the times data is available to $APU_4$ from the CDRAM. Waveforms 338, 340 and 342 provide similar information with respect to receipt of data by remaining APUs. A waveform 344 is a phase 0 clock that corresponds, in phase, to waveform 312. Waveform 346 is a DMA clock that corresponds generally in phase with clock 314, while waveform 348 is a DMA clock that corresponds with quadrature waveform 316. It will be apparent, as explained later, that each APU receives data from the CDRAM at different clock times, thereby reducing the instantaneous switching current at any given switch time.

Figure 4:
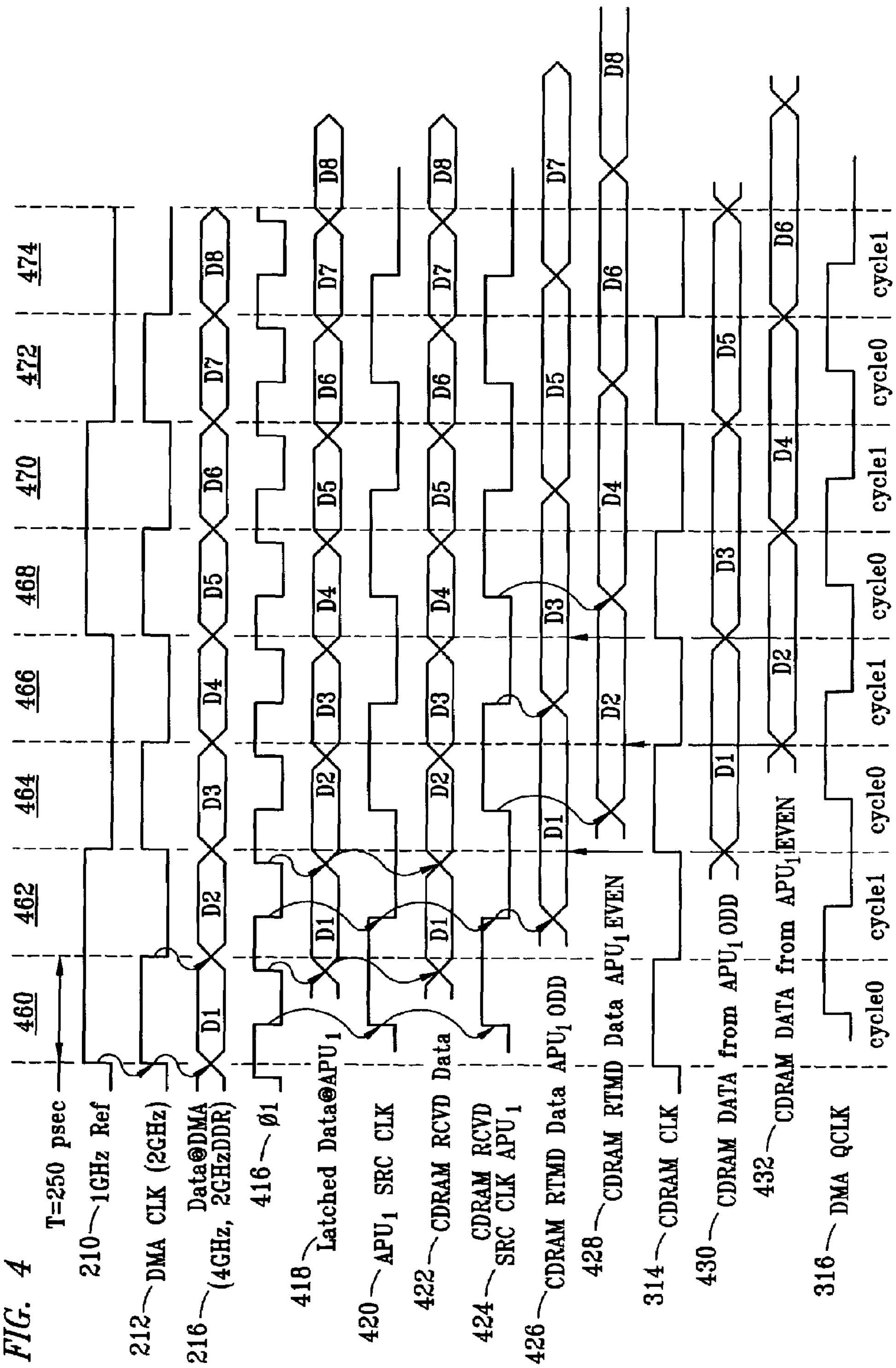

The waveforms of FIG. 4 are used in depicting the actions occurring in transferring data from $APU_1$ to the CDRAM. As before, transmission delays are ignored as they are accounted for in a properly designed chip and the showing of such delays would unduly complicate any discussion of operation of the invention.

In FIG. 4, there are a plurality of waveforms redrawn from previous FIGS. 2 and 3 and additional waveforms designated by even numbers from 416 through 432. For convenience in explaining the operation of FIG. 1 in conjunction with FIG. 4, eight 250 picosecond (psec) time periods "T" are designated with even numbers from 460 through 474. These waveforms are used in conjunction with the transfer of data from $APU_1$ to the CDRAM. The waveforms as drawn are idealized, as no actual transmission delay is shown A waveform 416 is a repeat of previously presented waveform 232. A waveform 420 is illustrative of an SRC (source synchronous clock) clock in $APU_1$. Such a source synchronous clock is typically one that is sent along with the data from the data source over some appropriate interface. A waveform 422 represents the time of assembly of data by $APU_1$ for the CDRAM. A waveform 424 is identical to waveform 420 and represents the clock from $APU_1$ as received by the CDRAM. A waveform 426 represents the odd data as retimed in the CDRAM by the clock in $APU_2$. A waveform 428 represents the even data as retimed in the CDRAM by the clock from $APU_1$. Waveforms 430 and 432 represent the odd and even data respectively received by the CDRAM from $APU_1$. As may be further noted, time periods 460, 464, 468 and 472 are labeled as cycle0 and the remaining time periods are labeled cycle1.

Figure 5:
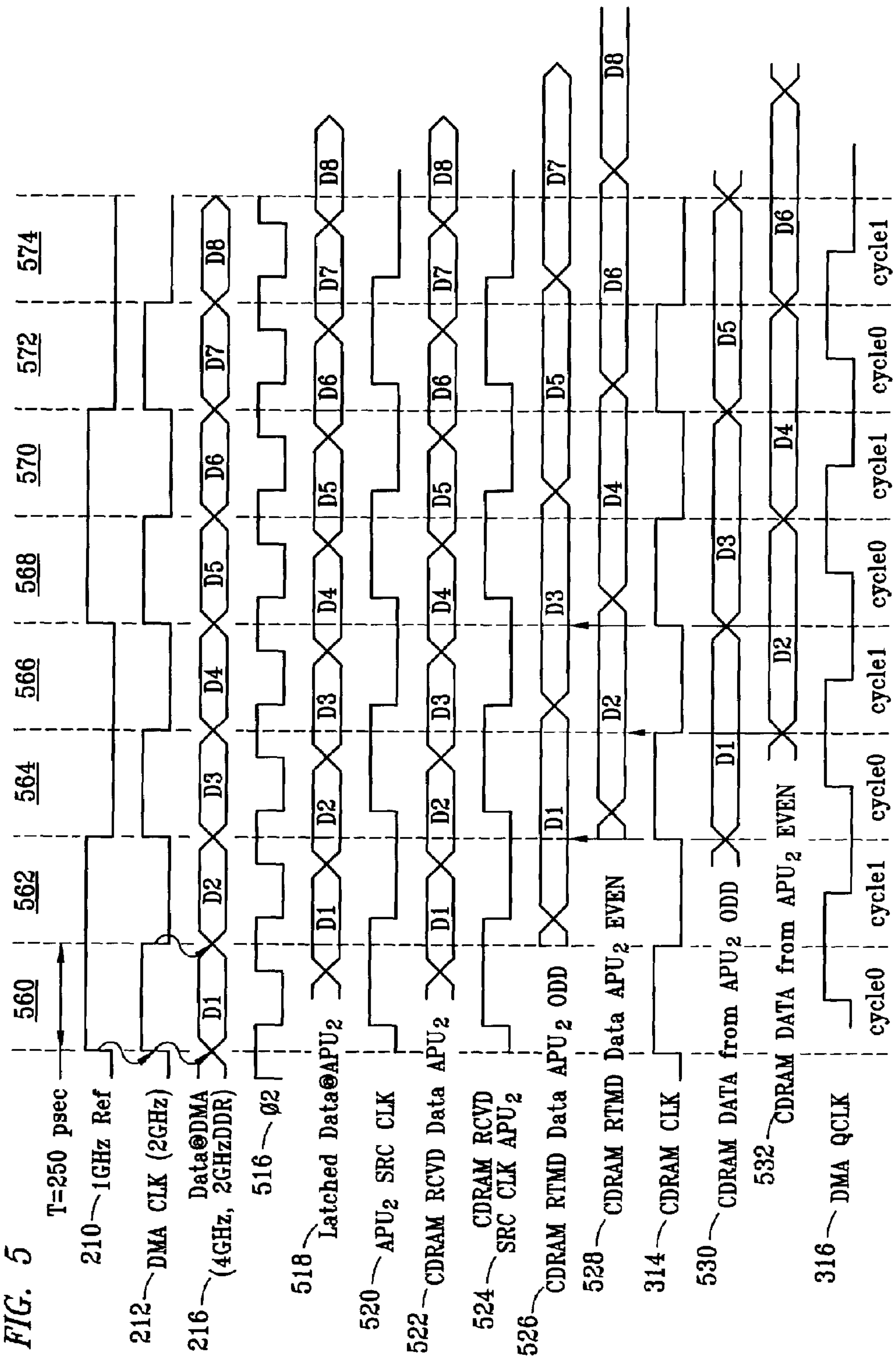

The waveforms of FIG. 5 are used in depicting the actions occurring in transferring data from $APU_2$ to the CDRAM. As before, transmission delays are ignored as they are accounted for in a properly designed chip and the showing of such delays would unduly complicate any discussion of operation of the invention.

In FIG. 5, there are a plurality of waveforms redrawn from previous FIGS. 2 and 3 and additional waveforms designated by even numbers from 516 through 532. For convenience in explaining the operation of FIG. 1 in conjunction with FIG. 5, eight 250 picosecond (psec) time periods "T" are designated with even numbers from 560 through 574. These waveforms are used in conjunction with the transfer of data from $APU_2$ to the CDRAM. The waveforms as drawn are idealized. as no actual transmission delay is shown.

A waveform 516 is a repeat of previously presented waveform 230. A waveform 518 is substantially the same as used in FIG. 4 except that it is shifted in time with respect to data waveform 418, since a different clock phase must typically be used for $APU_2$. A waveform 520 is illustrative of an SRC clock in $APU_2$. A waveform 522 represents the time of assembly of data from $APU_2$ at the CDRAM. A waveform 524 is identical to waveform 520 and represents the clock from $APU_2$ as received by the CDRAM. A waveform 526 represents the odd data as retimed in the CDRAM by the clock in $APU_2$. A waveform 528 represents the even data as retimed in the CDRAM by the clock from $APU_2$. Waveforms 530 and 532 represent the retimed odd and even data respectively received by the CDRAM from $APU_2$. As may be further noted, time periods 560, 564, 568 and 572 are labeled as cycle0 and the remaining time periods are labeled cycle1.

Figure 6:
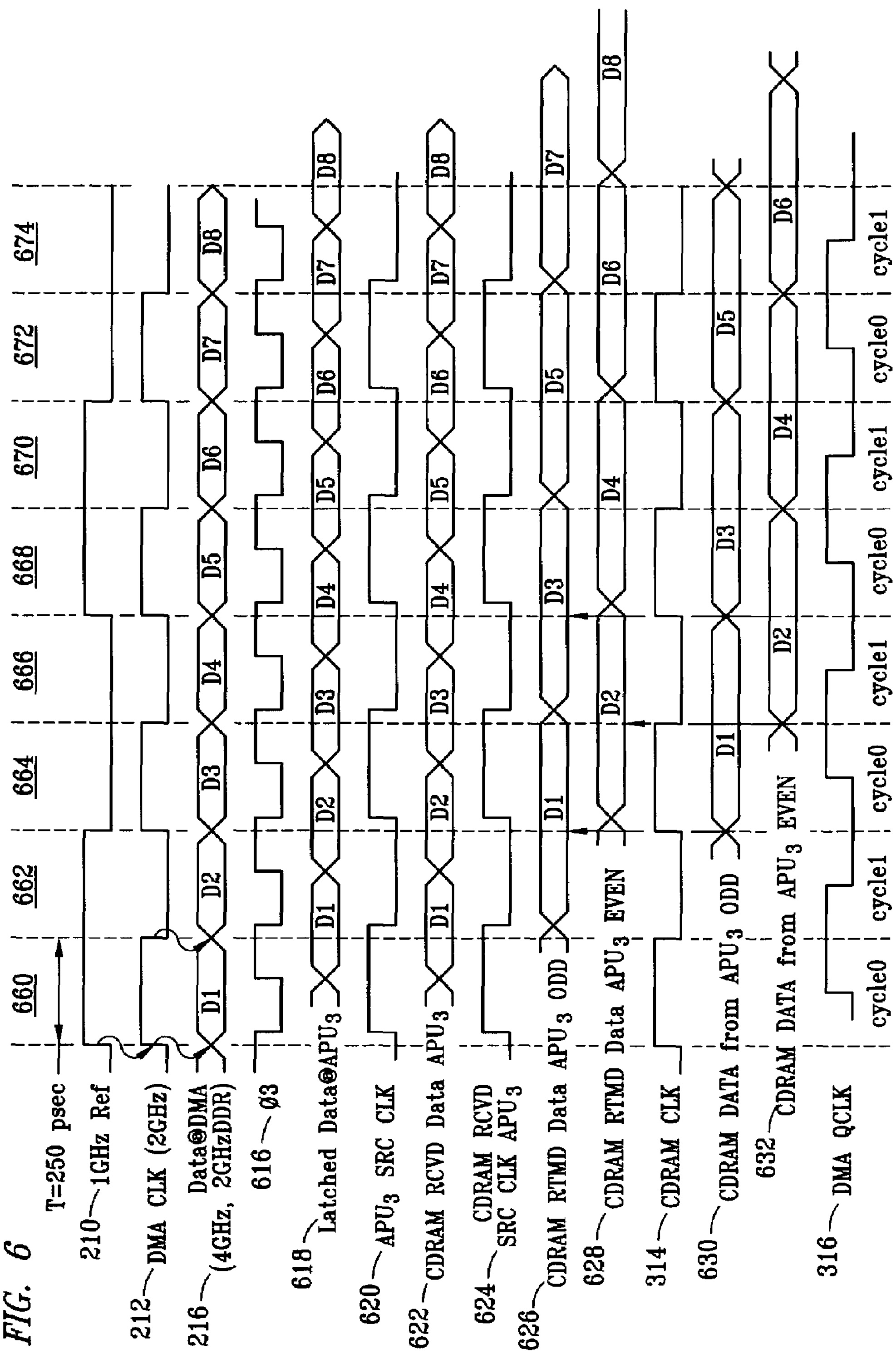

The waveforms of FIG. 6 are used in depicting the actions occurring in transferring data from $APU_3$ to the CDRAM. As before, transmission delays are ignored as they are accounted for in a properly designed chip and the showing of such delays would unduly complicate any discussion of operation of the invention. In FIG. 6, there are a plurality of waveforms redrawn from previous FIGS. 2 and 3 and additional waveforms designated by even numbers from 616 through 632. For convenience in explaining the operation of FIG. 1 in conjunction with FIG. 6, eight 250 picosecond (psec) time periods "T" are designated with even numbers from 660 through 674. These waveforms are used in conjunction with the transfer of data from $APU_3$ to the CDRAM. The waveforms as drawn are idealized, as no actual transmission delay is shown.

A waveform 616 is a repeat of previously presented waveform 228. A waveform 618 is substantially the same as used in FIG. 4 or 5 except that it is shifted in time with respect to data waveforms 418 and 518, respectively, since a different clock phase is used for $APU_3$. A waveform 620 is illustrative of an SRC clock in $APU_3$. A waveform 622 represents the time of assembly of data from $APU_3$ for the CDRAM. A waveform 624 is identical to waveform 620 and represents the clock from $APU_3$ as received by the CDRAM. A waveform 626 represents the odd data as retimed in the $APU_3$ for transmission to the CDRAM. A waveform 628 represents the even data as retimed in $APU_3$ for transmission to the CDRAM. Waveforms 630 and 632 represent the retimed odd and even data respectively received by the CDRAM from $APU_3$. As may be further noted, time periods 660, 664, 668 and 672 are labeled as cycle0 and the remaining time periods are labeled cycle1.

Figure 7:
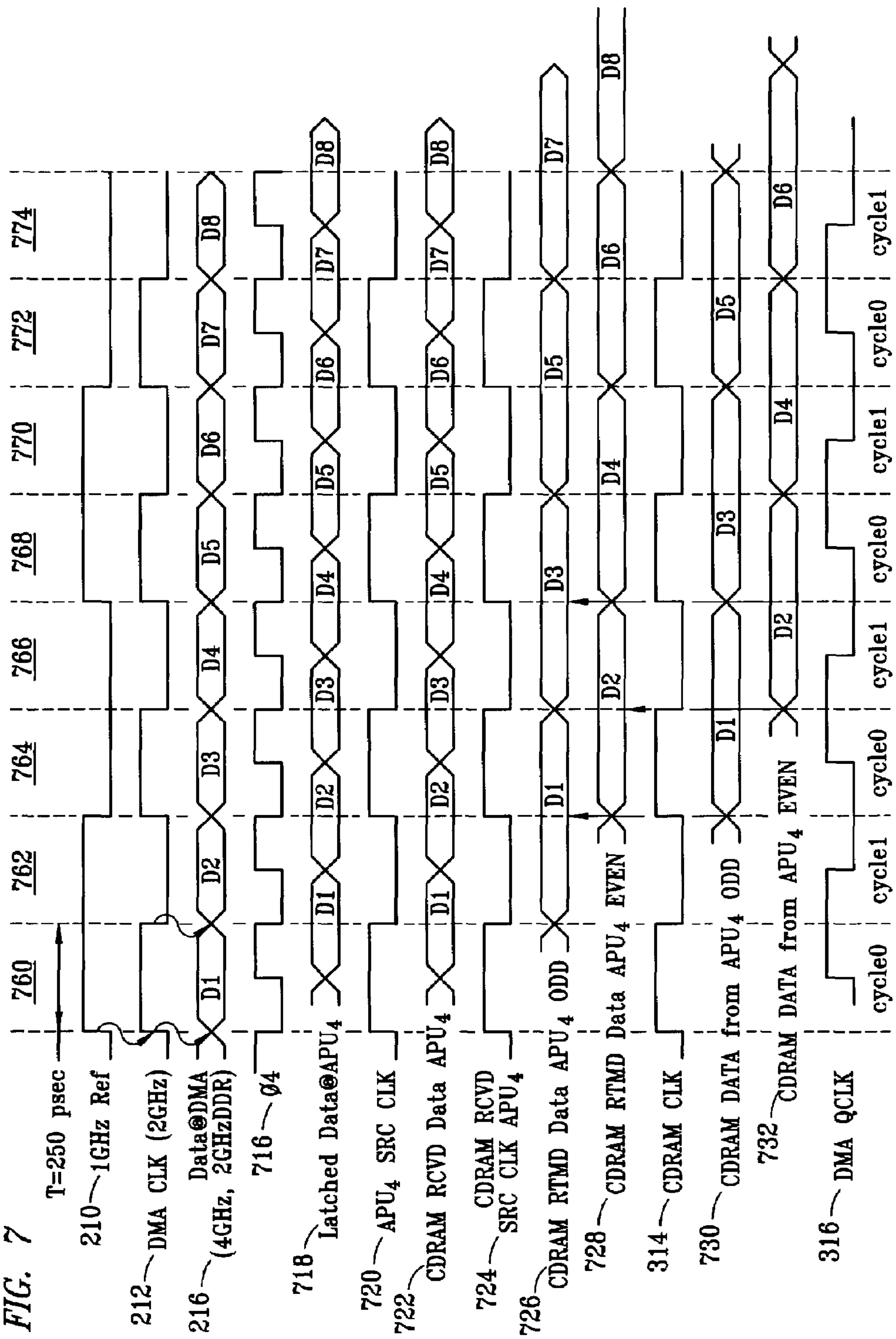

The waveforms of FIG. 7 are used in depicting the actions occurring in transferring data from $APU_4$ to the CDRAM. As before, transmission delays are ignored as they are accounted for in a properly designed chip and the showing of such delays would unduly complicate any discussion of operation of the invention. In FIG. 7, there are a plurality of waveforms redrawn from previous FIGS. 2 and 3 and additional waveforms designated by even numbers from 716 through 732. For convenience in explaining the operation of FIG. 1 in conjunction with FIG. 7, eight 250 picosecond (psec) time periods "T" are designated with even numbers from 760 through 774. These waveforms are used in conjunction with the transfer of data from $APU_4$ to the CDRAM. The waveforms as drawn are idealized as no actual transmission delay is shown.

A waveform 716 is a repeat of previously presented waveform 228. A waveform 718 is substantially the same as used in FIGS. 4, 5 and 6 except that it is shifted in time with respect to data waveforms 418, 518 and 618, respectively, since a different clock phase is used for $APU_4$. A waveform 720 is illustrative of an SRC clock in $APU_4$. A waveform 722 represents the time of assembly of data from $APU_4$ for the CDRAM. A waveform 724 is identical to waveform 720 and represents the clock from $APU_4$ as received by the CDRAM. A waveform 726 represents the odd data as retimed in the $APU_4$ for transmission to the CDRAM. A waveform 728 represents the even data as retimed in $APU_4$ for transmission to the CDRAM. Waveforms 730 and 732 represent the retimed odd and even data respectively received by the CDRAM from $APU_4$. As may be further noted, time periods 760, 764, 768 and 772 are labeled as cycle0 and the remaining time periods are labeled cycle1.

As may be ascertained from the above, data in the form of instructions or other information is transmitted between the main CPU 116 and each of the APUs 132 through 138 is a consecutive sequence via the ring network. If transmission delays prevent the data transfer in a given data cycle, it will be transferred in the next or later data cycle. Thus, each of the APUs on the chip can operate on to transfer data via the HSD at slightly different times thereby preventing a large amount of switching current from occurring at any given moment. These different switching times of data transfer is clearly shown in FIG. 3 for the times of data transfer from CDRAM to APU in connection with waveforms 336 through 342.

Although the invention has been described with reference to a specific embodiment, these descriptions are not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method for reducing simultaneous switching current in a microprocessor chip, comprising:

partitioning the chip into multiple independent processor cores, each with an associated clock domain;

generating a clock signal;

independently delaying the clock signal to produce multiple independent phase-staggered clock signals, each said signal being distributed to a differing said core and clock domain;

defining a plurality of intra-chip functions including high-speed I/O (input/output) latches and drivers associated with each of said cores; and distributing said intra-chip functions over the area of said chip in each of said cores clustered into areas corresponding and proximal to each said clock domain.

2. An electronic package including a plurality of separately partitioned microprocessor functions, comprising:

a clock signal generator;

independent delay circuitry to produce multiple independent phase-staggered clock signals, each clock signal providing same frequency but different phase output;

a plurality of electronic circuit partitions, distributed over the area of said electronic package, each including an independent processor core and an independent clock phase domain different from cores in other partitions of said electronic package;

intra-chip communication circuitry, associated with each of said cores, including I/O (input/output) latches and drivers; and circuit paths between the clock signal generator and the circuit partitions whereby different phase clock signals are provided to different partitions.

3. A method of communicating between a plurality of microprocessors on a single electronic chip, comprising:

partitioning the chip into a plurality of areas;

placing some of the processors and associated intra-chip input/output circuitry in different partitions where different independent partitions have different clock domains;

generating a clock signal; and independently delaying the clock signal to provide same frequency but different phase independent clock signals to each of said partitions having different clock domains whereby load switching currents occur at different times for each of said clock domains.

4. A method for reducing simultaneous switching current in a microprocessor chip, comprising:

partitioning the chip into multiple independent processor cores, each with an associated clock domain, each of the partitions including associated intra-chip input/output functionality;

generating a clock signal; and independently delaying the clock signal to provide same frequency but different phase independent clock signals to the processor cores in each of said partitions whereby load switching currents occur at different times for each of said clock domains.

5. An electronic package including a plurality of separately partitioned microprocessor functions, comprising:

a plurality of electronic circuit partitions, distributed over the area of said electronic package, each including an independent processor core and an independent clock phase domain different from cores in other partitions of said electronic package;

intra-chip communication circuitry, associated with said cores in each of said partitions; and delay circuitry to produce multiple independent clock signals of same frequency but different phase output providing different phase clock signals to different partitions.

6. A method for reducing simultaneous switching current in a microprocessor chip, comprising the steps of:

interconnecting a plurality of independent microprocessors using different intra-chip input/output circuitry, comprising latches and drivers, for each microprocessor;

generating a clock signal; and independently delaying the clock signal to provide same frequency but different phase independent output clock signals to different ones of said different intra-chip input/output circuitry.

7. An electronic package including a plurality of separately partitioned microprocessor functions, comprising:

a clock signal generator;

a plurality of independent delay circuits, wherein each delay circuit is directly connected to the clock signal generator and produces a different independent phase-staggered clock signal, wherein the plurality of phase-staggered clock signals provide the same frequency but different phase output;

a plurality of electronic circuit partitions, distributed over the area of said electronic package, each including an independent processor core and an independent clock phase domain different from cores in other partitions of said electronic package, wherein each electronic circuit partition is connected to the output of a different delay circuit of the plurality of delay circuits; and intra-chip communication circuitry, associated with each of said cores, including I/O (input/output) latches and drivers.

8. The method of claim 1, wherein the step of independently delaying the clock signal further comprises providing the clock signal to a plurality of independent delay circuits.

9. The electronic package of claim 2, wherein independent delay circuitry further comprises a plurality of independent delay circuits.

10. The electronic package of claim 9, wherein each delay circuit of the plurality of delay circuits is directly connected to the clock signal generator.

11. The electronic package of claim 2, wherein the clock signal generator is a phase-locked loop (PLL).

12. The method of claim 3, wherein the step of independently delaying the clock signal further comprises providing the clock signal to a plurality of independent delay circuits.

13. The method of claim 4, wherein the step of independently delaying the clock signal further comprises providing the clock signal to a plurality of independent delay circuits.

14. The electronic package of claim 5, wherein the delay circuitry further comprises a plurality of independent delay circuits.

15. The electronic package of claim 14, wherein each delay circuit of the plurality of delay circuits is directly connected to a clock signal generator.

16. The electronic package of claim 15, wherein the clock signal generator is a PLL.

17. The method of claim 6, wherein the step of independently delaying the clock signal further comprises providing the clock signal to a plurality of independent delay circuits.

18. The electronic package of claim 7 wherein the clock signal generator is a PLL.

* * * * *